Y. C. FREED.
CAGE FOR ROLLER BEARINGS.
APPLICATION FILED JULY 17, 1914.

1,147,497.

Patented July 20, 1915.
3 SHEETS—SHEET 1.

Witnesses —
Will H Burrows
Walter R Fullinger

Inventor —
Yellis C. Freed.
by his Attorneys.
Howson & Howson

Y. C. FREED.
CAGE FOR ROLLER BEARINGS.
APPLICATION FILED JULY 17, 1914.

1,147,497.

Patented July 20, 1915.
3 SHEETS—SHEET 2.

Witnesses—
Willet Burrows
Walter R Pullinger

Inventor—
Yellis C. Freed.
by his Attorneys:
Howson & Howson

Y. C. FREED.
CAGE FOR ROLLER BEARINGS.
APPLICATION FILED JULY 17, 1914.

1,147,497.

Patented July 20, 1915.
3 SHEETS—SHEET 3.

Witnesses—

Inventor
Yellis C. Freed.
by his Attorneys.
Howson & Howson

UNITED STATES PATENT OFFICE.

YELLIS C. FREED, OF ROYERSFORD, PENNSYLVANIA.

CAGE FOR ROLLER-BEARINGS.

1,147,497.

Specification of Letters Patent. Patented July 20, 1915.

Application filed July 17, 1914. Serial No. 851,523.

*To all whom it may concern:*

Be it known that I, YELLIS C. FREED, a citizen of the United States, and a resident of Royersford, Montgomery county, Pennsylvania, have invented certain Improvements in Cages for Roller-Bearings, of which the following is a specification.

My invention relates to roller bearings, and the object of my invention is to provide an improved form of cage or support for the rollers whereby the latter may be held in spaced relation with respect to each other and properly retained and positioned with respect to the surface with which said rollers engage.

My present improvements relate to an improved form of sectional cage, and to means for retaining the shells or sections comprising the cage in assembled condition with the rollers retained thereby; while a further feature of my invention is the employment of means carried by the cages for longitudinally positioning the rollers.

My improved cage is preferably made of sheet metal sections pressed into shape, although it will be understood that it may be made of other forms of metal.

Figure 1:
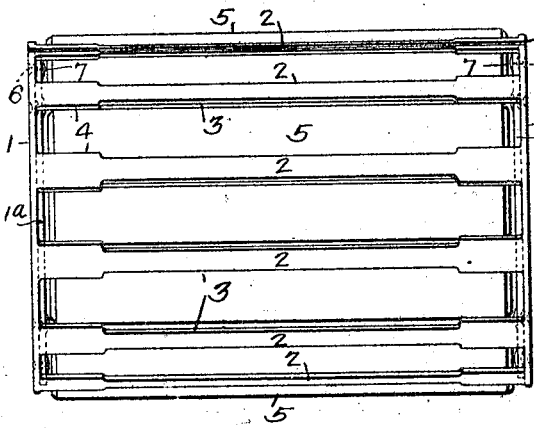
Figure 2:
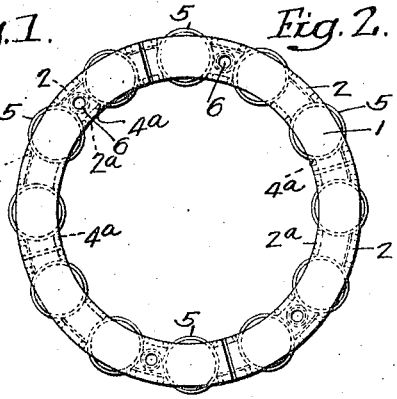
Figure 4:
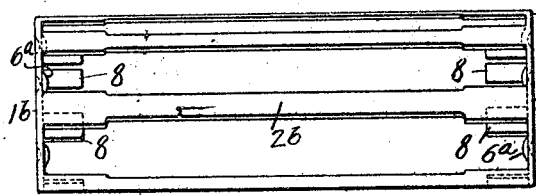
Figure 3:
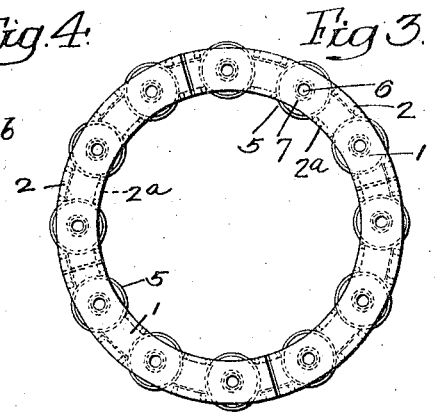
Figure 5:
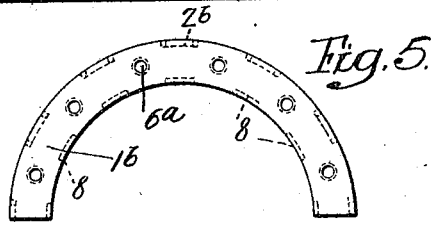
Figure 6:
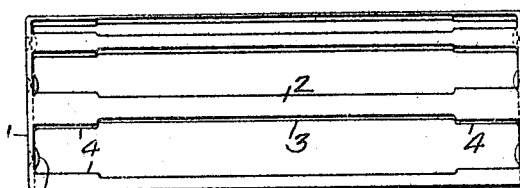
Figure 7:
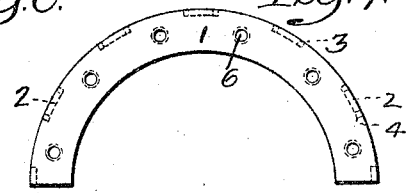
Figure 8:
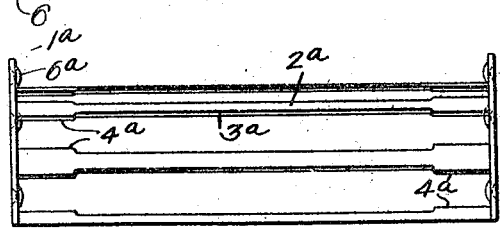
Figure 9:
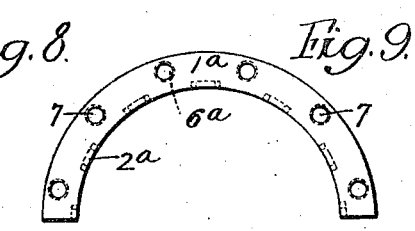
Figure 10:
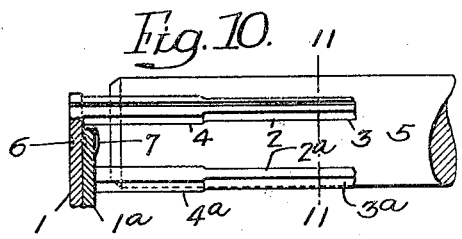
Figure 11:
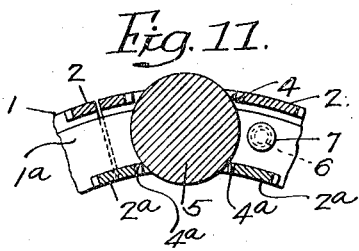
Figure 12:
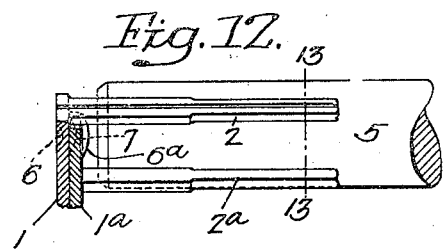
Figure 13:
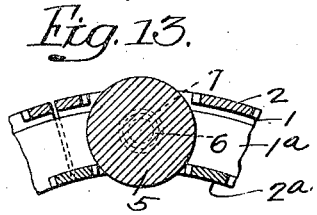
Figure 16:
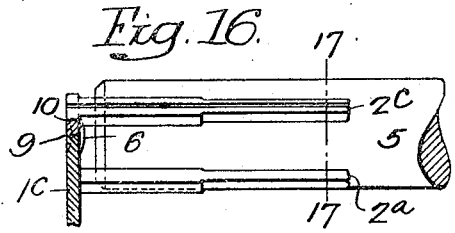
Figure 17:
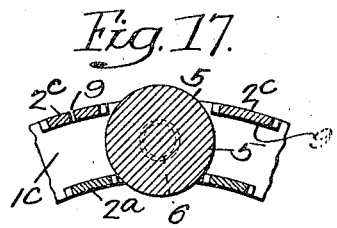
Figure 14:
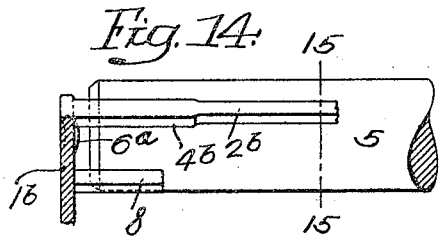
Figure 15:
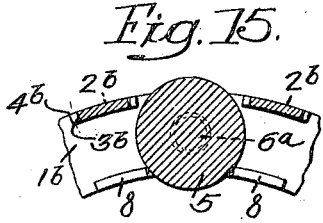
Figure 18:
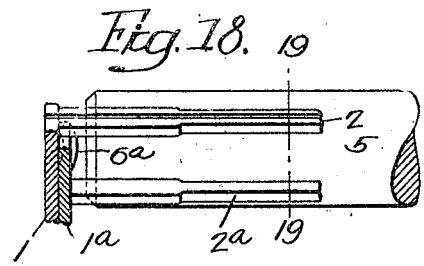
Figure 19:
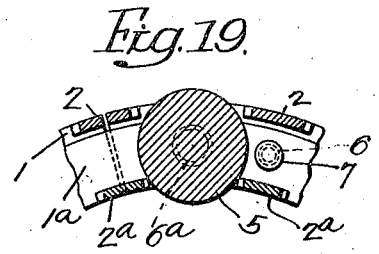
Figure 20:
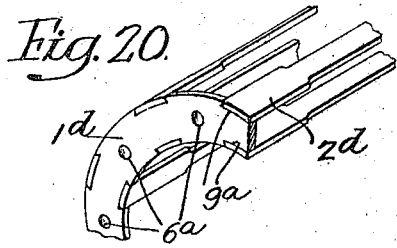
Figure 21:
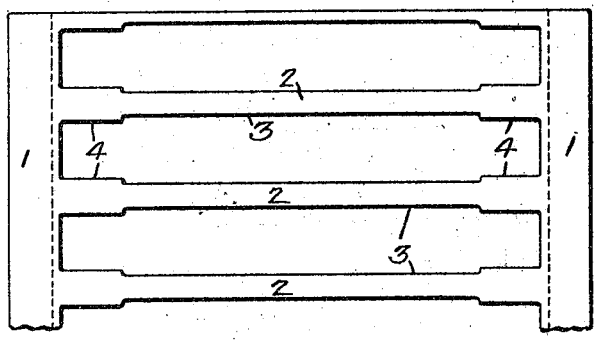
Figure 22:
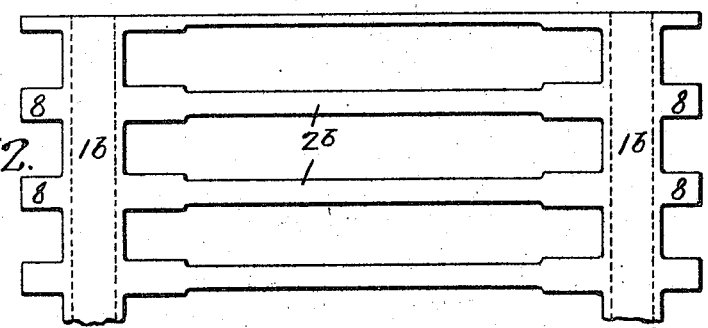
Figure 23:
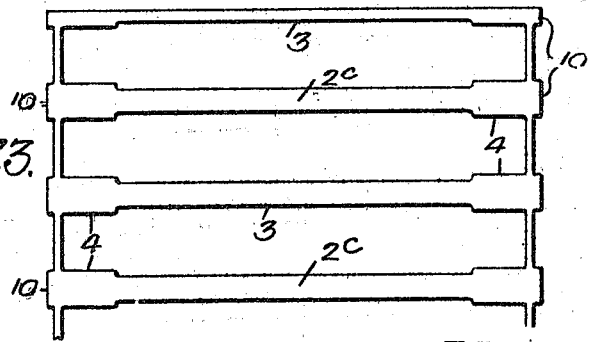

These and other features of my invention are more fully described hereinafter, reference being had to the accompanying drawings, in which:

Figure 1, is a side elevation of one form of cage within the scope of my invention, showing the rollers in place; Fig. 2, is an end elevation of the same; Fig. 3, is a view similar to Fig. 2, illustrating a modified arrangement or construction within the scope of my invention; Fig. 4, is a view of a shell employed in making up one form of cage, illustrating a further modification within the scope of my invention; Fig. 5, is an end elevation of the shell shown in Fig. 4; Fig. 6, is a side elevation of one of the outer shells substantially like those in Figs. 1 and 2, but having details of construction illustrated in Fig. 3; Fig. 7, is an end elevation of the shell shown in Fig. 6; Fig. 8, is a side elevation of an inner shell; Fig. 9, is an end elevation of the shell shown in Fig. 8; Figs. 10 and 11, are enlarged views; Fig. 11, being in section on the line 11—11, Fig. 10, illustrating details of the structure shown in Figs. 1 and 2; Figs. 12 and 13, are views similar to Figs. 10 and 11; Fig. 13, being in section on the line 13—13, Fig. 12, illustrating details of the structure shown in Fig. 3; Figs. 14 and 15, are views similar to Figs. 10 and and 11; Fig. 15, being in section on the line 15—15, Fig. 14, illustrating details of the structure shown in Figs. 4 and 5; Figs. 16 and 17, are views similar to Figs. 10 and 11; Fig. 17, being in section on the line 17—17, Fig. 16, illustrating a modification within the scope of my invention; Figs. 18 and 19, are views similar to Figs. 10 and 11; Fig. 19, being in section on the line 19—19, Fig. 18, illustrating another modification within the scope of my invention; Fig. 20, is a perspective view illustrating a further modified structure; Fig. 21, is a plan view of a blank cut from sheet metal for shells of the type illustrated in Figs. 1, 2, 3, *et seq.;* Fig. 22, is a plan view of a blank cut from sheet metal for the shell illustrated in Figs. 4 and 5, and Fig. 23, is a plan view of a blank cut from sheet metal for a shell of the type shown in Figs. 16 and 17.

In roller bearings of the type to which my invention is applicable, the rollers may be cylindrical or tapered, and the purpose of the cage is to retain said rollers in proper relative position with respect to each other so as to avoid contact between the same on the one hand, while maintaining proper alinement with the axis of the shaft on the other hand. I have illustrated in the accompanying drawings several types of cages for supporting and spacing these rollers, all of which, however, have certain features in common.

Referring to Figs. 1, 2, *et seq.*, I show a structure having a plurality of inner and outer shells which, when assembled together, two of each, form the complete cage. These shells are preferably constructed as follows: Each of the outer shells has end plates 1, semi-circular in contour, and between the outer or longer edge of the same connecting pieces or ribs 2 are provided, which ribs may have parallel sides, or their central portion may be cut away, as at 3, to provide lateral projections 4 at their ends for slight contact with the rollers. A pair of these outer sectional shells is employed. The inner sectional shells are of substantially the same type except that the connecting members or ribs 2ª are oppositely disposed with respect to those of the outer shells; the flanges or end plates 1ª of the inner shells being bent away from, while those of the outer shells are bent toward, the axis of the completed cage.

When the two sets of shells are fitted together they provide an annular space for the reception of the rollers 5, which project through the spaces between the ribs 2 and 2ª; being retained in place by the slight engagement of the lateral projections 4 and 4ª at the ends of said connecting ribs which prevent their accidental dislodgment or removal from the cage. These cages are preferably assembled so that the joint between the inner sections or shells is at a point removed from the joint of the outer sections or shells, and they are preferably held together by interlocking means on the end flanges of the respective shells. Such interlocking means may and preferably do consist of bosses 6 on the inner side of the end walls 1 of the outer shells fitting recesses or cups 7 formed in the outer side of the end walls 1ª of the inner shells. These bosses and cups are formed in said end walls before the sections or shells are assembled with the rollers, and when put together with the rollers in proper position they are sprung into place. Their function, in the structure shown in Figs. 1 and 2, and in the enlarged views, Figs. 10 and 11, is merely to hold the sections of the cage together, and for this purpose four sets of interlocking cups and bosses will be sufficient, although more may be employed if desired.

In the construction or arrangement shown in Fig. 3, and the enlarged views, Figs. 12 and 13, the formation of the bosses 6 and cups 7 in the end flanges is opposite the axis of the rollers, and in this arrangement the rounded bosses or projections indicated at 6ᵉ which are formed on the inner surface of the inner end plates 1ª, are for engagement with the ends of the rollers; such bosses or projections serving to position said rollers longitudinally, while the bosses or projections 6 engaging the cups 7 serve the function of securing the end plates of the several sections together.

If desired, the two pairs of half shells, inner and outer, suitably connected together, by the interlocking means or otherwise, may be disposed with their joints in line so that the complete shell is sectional and may be separated upon a median line.

If desired, I may employ a cage made up of a pair of single shells having continuous connecting arms or bars 2ᵇ between end plates or flanges 1ᵇ; such arms or bars being disposed either inside or outside the rollers, with short integral sections 8 bent from the end flanges or plates opposite the said connecting bars 2ᵇ, as shown in Figs. 4 and 5; which short sections serve to retain the rollers in position, as shown in Figs. 14 and 15. With this construction, the bosses 6ª may be employed for end engagement with the rollers.

It will be understood, of course, that the rollers may be positioned longitudinally by bosses 6ª formed on the inner side of the end walls of the inner shells alone, when inner and outer shells are employed to form the cage, with additional interlocking bosses and cups 6 and 7 formed in the respective walls at two or more points to secure said end walls together independently of the bosses employed to position the rollers; such arrangement being shown in Figs. 18 and 19. It will also be understood that the bosses which position the rollers longitudinally may be those formed by cupping the inner end walls to receive projections from the adjacent outer end walls and intended to secure together the several end walls and through them the shells making up the cage.

In the structure shown in Figs. 16 and 17, the inner shell has its end wall 1ᶜ notched at 9 to receive projections 10 disposed opposite the connecting arms or ribs 2ᶜ; such structure being held in place by welding or swaging, or by riveting the projections 10 to said end wall.

In the structure shown in Fig. 20, separate end walls 1ᵈ are provided, consisting of semi-circular pieces of metal having their edges notched at 9ª to receive the ends of arms or ribs 2ᵈ which are held to said end walls by welding, swaging or riveting the same thereto. These notches may be undercut at the ends. A cage so made will have bosses formed in its end walls to engage and position the rollers, and it will be in two parts. If desired, a cage can be made of pairs of inner and outer end walls, each separately connected by cross bars welded, riveted, or otherwise fastened thereto, assembled in the manner in which the structure shown in Figs. 1 and 2 is assembled, and secured by the interlocking bosses and cups.

Figs. 21, 22 and 23, show clearly the sort of blank that is employed in making the shells for the several forms of roller-retaining cages shown and described.

While I have shown my improved structure as employed with straight rollers, it will be understood that similarly constructed cages, properly designed with respect to size and shape, may be employed with tapered rollers, without departing from my invention.

I claim:

1. A cage for roller bearings comprising a plurality of interconnecting sectional shells, said shells comprising end plates with connecting bars, and said end plates overlying each other and covering the joints of adjacent end plates and connected together by mutually interlocking means carried thereby.

2. A cage for roller bearings comprising a plurality of interconnecting sectional shells, said shells comprising end plates with connecting bars, said end plates overlying each other and covering the joints of adjacent end plates, said bars being cut away at their central portion to provide laterally extending projections at their ends, and said end plates being connected together by mutually interlocking means carried thereby.

3. A cage for roller bearings comprising a plurality of interconnecting sectional shells, said shells comprising end plates with connecting bars, said end plates overlying each other and covering the joints of adjacent end plates and being connected together by interlocking portions formed in said plates.

4. A cage for roller bearings comprising a plurality of inner and outer interconnecting shells, said shells comprising end plates with connecting bars, said bars being cut away at their central portion to provide laterally extending projections at the ends, and said end plates overlying each other and covering the joints of adjacent end plates and being connected together by interlocking portions formed directly in said plates.

5. In a cage for roller bearings, the combination of a plurality of inner and outer sectional shells having end walls and assembled in interconnected relation for the retention of rollers, said end walls overlying each other and covering the joints of adjacent end walls and having interlocking connecting means, and bosses formed on the inner surface of said end walls for bearing engagement with the ends of rollers.

6. In a cage for roller bearings, the combination of a plurality of inner and outer sectional shells each having end walls and assembled in interconnected relation for the retention of rollers, said end walls overlying each other and covering the joints of adjacent end walls and having interlocking connecting means, rollers mounted in said shells, and bosses formed on the inner surface of said end walls for bearing engagement with the ends of said rollers.

7. In a cage for roller bearings, the combination of a plurality of inner and outer sections assembled for the retention of rollers and having means for connecting the same together, said sections having end walls overlying each other and covering the joints of adjacent end walls, and bosses formed on the inner surface of said end walls for bearing engagement with the ends of rollers.

8. In a cage for roller bearings, the combination of a plurality of sections each having a plurality of end walls assembled in interconnected relation for the retention of rollers, bosses formed on the inner surface of the inner end walls for engagement with the ends of the rollers, and bosses formed on the inner surface of the outer end walls for engagement with the recesses formed by the other bosses and serving to connect said end walls.

9. The combination, in a cage for roller bearings, of a plurality of inner and outer shells, each comprising end walls and connecting bars therefor, the end walls of the respective shells overlying each other and those of one set breaking joint with those of the other set, said sections being secured together by interlocking portions formed in the several end walls, and means carried by certain of said end walls for longitudinally positioning the rollers.

10. The combination, in a cage for roller bearings, of a plurality of shells, each comprising end walls and integral connecting bars, said end walls overlying each other and having interlocking portions whereby they are secured together, and means carried by certain of said end walls for longitudinally positioning the rollers.

11. A cage for roller bearings comprising pairs of inner and outer sectional shells, each shell of each pair having end walls with connecting bars between said end walls, the connecting bars of one set of shells being inwardly disposed and the connecting bars for the other set of shells being outwardly disposed whereby a roller-receiving space is provided between said connecting bars, the inner and outer end walls of the respective shells overlying each other, and means carried by said walls whereby they may be secured together.

12. A cage for roller bearings comprising pairs of inner and outer sectional shells, each shell of each pair having end walls with connecting bars between said end walls, the connecting bars of one set of shells being inwardly disposed and the connecting bars for the other set of shells being outwardly disposed whereby a roller-receiving space is provided between said connecting bars, the inner and outer walls of the rspective shells overlying each other, interconnecting means carried by said walls whereby they may be secured together, and bosses carried by certain of said end walls for bearing engagement with the ends of the rollers held between the same.

13. A cage for roller bearings comprising pairs of inner and outer sectional shells, each shell of each pair having end walls with connecting bars between said end walls, the connecting bars of one set of shells being inwardly disposed and the connecting bars for the other set of shells being outwardly disposed whereby a roller-receiving space is provided between said connecting bars, the inner and outer walls of the respective shells overlying each other and covering the joints of the adjacent end walls, and means carried by said walls whereby they may be secured together.

14. A cage for roller bearings comprising pairs of inner and outer sectional shells, each shell of each pair having end walls with connecting bars between said end walls, the connecting bars of one set of shells being inwardly disposed and the connecting bars for the other set of shells being outwardly disposed whereby a roller-receiving space is provided between said connecting bars, the inner and outer walls of the respective shells overlying each other and covering the joints of adjacent end walls, means carried by said walls whereby they may be secured together, and bosses carried by certain of said end walls for bearing engagement with the ends of the rollers held between the same.

In testimony whereof, I have signed my name to this specification, in the presence of two subscribing witnesses.

YELLIS C. FREED.

Witnesses:
F. H. DEISHER,
WM. L. KÜHRLING.